United States Patent Office 3,179,720
Patented Apr. 20, 1965

3,179,720
POLYETHYLENE BLENDS
Arthur G. Hillmer, Wilmington, Del., assignor to Hercules Powder Company, Wilmington, Del., a corporation of Delaware
No Drawing. Filed Oct. 22, 1962, Ser. No. 232,262
2 Claims. (Cl. 260—897)

This invention relates to blends of polyethylenes that exhibit improved extrusion characteristics. More particularly, it relates to blends of two different high density polyethylenes that exhibit better extrusion characteristics than does a single high density polyethylene of melt index and density the same as the blend.

In recent years, high density polyethylene made by means of a transition metal catalyst, i.e., so-called Ziegler-type polyethylene, has found extensive commercial use in a variety of applications. By variations in the process by which such polyethylene is made, it is possible to produce polymers having a density varying from about 0.94 to 0.97 g./cc. Since the density of these polymers is directly proportional to stiffness, the more dense of these polymers, i.e., those having a density of 0.96 or higher, are particularly useful in the manufacture of large size bottles, such as gallon jugs, where rigid sidewalls are needed for adequate performance. The usual procedure for making such bottles is blow molding in which the molten polymer is extruded in the form of a tube and the tube is then expanded by internal air pressure within the confines of a mold having the desired shape.

In addition to stiffness, or high density, another criterion for polyethylene to be useful in the manufacture of large size bottles is high molecular weight. If the molecular weight of the polymer is not reasonably high, it possesses very poor resistance to stress cracking in the presence of liquids such as are ordinarily stored in bottles.

A property of polyethylene that is inversely proportional to molecular weight is melt index, i.e., a high molecular weight polymer will possess a low melt index while a low molecular weight polymer will possess a high melt index. Hence, the molecular weight of polyethylene is an important factor in influencing the ease of extrusion of the polymer.

It has been found in the production of higher density transition metal-catalyzed polyethylene that if the molecular weight of the polymer is made high enough to give it good resistance to stress cracking, it will often possess relatively poor extrudability. The result of this is that bottles prepared from a high molecular weight, higher density polymer often have an objectionably rough, or alligatored, surface. The rough surface affects both the appearance and the strength characteristics of the bottle. Hence, it is obvious that methods for reducing the inherently poor extrusion characteristics of the high molecular weight, higher density transition metal-catalyzed polyethylenes are very much in need.

The present invention has as one of its objects the provision of means of improving the extrusion characteristics of higher density transition metal-catalyzed polyethylene without sacrificing its inherently high stiffness.

In accordance with the invention, it has been found that blends of two different transition metal-catalyzed polyethylenes, both of which have a density of at least 0.96 but one of which has a relatively high molecular weight and the other a relatively low molecular weight, exhibit a balance of desirable properties that cannot be attained in a single polymer. Specifically, the blends of the invention possess both excellent extrudability and resistance to stress cracking which makes the blends especially suitable for the blow molding of larger sized bottles.

More particularly, the invention relates to polymer blends comprising two different transition metal-catalyzed polyethylenes, each having a density of at least about 0.96, one of said polyethylenes having a melt index ($I_2$, 190° C.) of at least 3.0 and the other having a melt index ($I_2$, 190° C.) below about 0.3, each of said polyethylenes being present in the amount of at least about 25% by weight of the total blend, and the blend having a melt index ($I_2$, 190° C.) between about 0.3 and 1.5. The expression ($I_2$, 190° C.) refers to the melt index measured according to ASTM test #D–1238–57T, procedure "E," wherein the test is conducted at 190° C. with a total loading of 2160 grams.

The polymer blends of the invention are made simply by mixing the individual components of the blend by known procedures. For the sake of simplicity, it is preferred to mix the component polymers in particulate form, i.e., uniformly sized particles of the components are simply mixed together, as by tumbling, in the proportions necessary to produce the desired melt index in the blend. However, the component polymers can be melt blended if desired.

By high density transition metal-catalyzed polyethylene is meant the high molecular weight solid polyethylene produced by polymerizing ethylene at comparatively low pressures and temperatures according to a process first proposed by Karl Ziegler and his associates in Germany. In this process, mixtures of an organometallic component of a Group I–A, II–A, or III–A metal, such as aluminum alkyls or aryls, and a reducible compound of a Group IV–B, V–B, or VI–B transition metal including thorium and uranium are employed as catalysts for the polymerization. The polymerization is carried out under relatively mild conditions of pressure and temperature, e.g., at 1–100 atmospheres and 50–250° C. The organometallic component of the catalyst may be an aluminum trialkyl or triaryl, e.g., aluminum triethyl, aluminum tripropyl, aluminum triisobutyl, aluminum trioctyl, aluminum tridecyl, aluminum triphenyl, etc., or one of the alkyl or aryl groups may be replaced by halogen, alkoxy, or aryloxy as in diethylaluminum chloride, dimethylaluminum methoxide, diphenylaluminum bromide, diphenylaluminum phenoxide, etc., or a corresponding compound of sodium, lithium, gallium, indium, thallium, etc. Aluminum alkyls and alkylaluminum halides are preferred. The transition metal component of the catalyst is preferably titanium tetrachloride, but may be any reducible compound of titanium, zirconium, thorium, uranium, tantalum, chromium, vanadium, tungsten, etc. The exact nature of the catalyst is not known, but since the two components thereof react immediately upon admixture, it seems clear that the catalyst itself constitutes some sort of a reaction product in which the transition metal is present in a reduced state. The reduced form of the transition metal may be activated by addition of further quantities of organometallic compound.

The polymerization reaction is carried out in the presence of an inert liquid reaction medium which is preferably a hydrocarbon such as pentane, hexane, heptane, gas oil, diesel fuel, cyclohexane, benzene, xylene, etc. Conveniently, the organoaluminum compound is dissolved in the reaction medium and the heavy metal compound is added gradually while dissipating the exothermic heat of reaction. In most cases, the reaction product is only slightly soluble in the reaction medium so that for the most part the product so prepared comprises a dispersion of the catalytically active material in the liquid reaction medium. This product is then placed in a pressure vessel and the gaseous ethylene is introduced into the vessel under the desired reaction pressure, e.g., 1–100 atmospheres. The vessel and contents are heated at the desired reaction temperature until the pressure within the vessel reaches a low fixed value. The crude polymerizate is then removed from the vessel and is treated with methanol or the like to "kill" or deactivate the catalyst. The solid polyethylene is then filtered off and is washed with methanol to remove the decomposed metal catalyst and thereby obtain a substantially ash-free odorless polyethylene product.

While the above-described polymerization procedure can be used to produce polyethylene having a density range from about 0.94 to 0.97, the invention is, of course, concerned with polymers that have a density of above at least about 0.96. The density of the polymers can be controlled by known methods. For example, when using a titanium chloride catalyst, the density can be controlled by regulating the ratio of tetravalent to trivalent titanium in the catalyst. Polymers of differing molecular weight are readily prepared by employing hydrogen to regulate molecular weight according to well-known procedures.

The invention is not limited to the blending of only two polymers. The blends may comprise more than two polymers, as will be shown in the examples, but the invention does require that at least two different polymers be present, each of which has the characteristics previously described, and that these two polymers each comprise at least about 25% by weight of the polymer blend.

In the examples that follow, extrudability of the blends in the individual polymers employed as controls was evaluated in a 1-inch MPM extruder which was fitted with a ⅛-inch strand die and was operated with all controllers regulating the temperature of the block, cylinder, and die set at 390°. The extruder screw speed was 90 r.p.m., and the take-up rate was 28–30 feet per minute. After allowing the extruder to reach equilibrium conditions, the surface quality of the extrudate strand was rated by visual observation in order of increasing smoothness as very rough (VR), rough (R), some roughness (SR), smooth (S), and very smooth (VS).

The stress-cracking resistance of the blends and individual polymers described in the examples was evaluated using the ASTM method entitled "Proposed Method of Test for Environment Stress Cracking of Ethylene Plastics" with the following modifications:

(1) Glass channels were used in place of copper channels;
(2) Channel width was increased by 0.103 inch;
(3) The specified detergent solution was replaced by a standard solution of sodium hypochlorate bleach; and
(4) A nicking jig was used to give a nick of 0.02 inch in a 0.075-inch specimen.

The results are reported in terms of hours to failure.

The examples are presented for the purpose of illustration and not by the way of limitation. All parts and percentages are by weight unless otherwise specified.

EXAMPLES

In the examples, all blends were prepared by blending the individual components in the form of molding powder by simply placing the individual types of molding powder in a V-blender and operating the blender for five minutes. All polymers had a density of 0.962 and were prepared by polymerizing ethylene in a mixture of aliphatic hydrocarbons having a boiling point of 180–200° C. in the presence of a catalyst prepared from $TiCl_4$ and ethylaluminum sesquichloride using hydrogen to regulate molecular weight. Each polymer contained 0.1% butylated hydroxy toluene as stabilizer.

Additional data and results are given in the following table.

*Table*

| Example No. | Component(s) | | | Blend Melt index ($I_2$, 190° C.) | Extrusion | | Bleach cracking (hrs.) |
|---|---|---|---|---|---|---|---|
| | Percent | Melt index ($I_2$, 190° C.) | RSV | | Pass | Surface | |
| Control | 100 | 0.69 | 2.8 | 0.69 | 1 | R | 105 |
| | | | | | 2 | SR | 80 |
| 1 | 62.5 | 3.3 | 2.0 | 0.76 | 1 | VS | 140 |
| | 37.5 | 0.12 | 4.2 | | 2 | VS | |
| 2 | 53 | 5.8 | 1.85 | 0.64 | 1 | S | 134 |
| | 47 | 0.12 | 4.2 | | 2 | VS | |
| 3 | 47 | 9.3 | 1.6 | 0.61 | 1 | S | 128 |
| | 53 | 0.11 | 4.2 | | 2 | VS | |
| 4 | 50 | 9.3 | 1.6 | 0.70 | 1 | VS | ---- |
| | 50 | 0.12 | 4.2 | | 2 | VS | |
| 5 | 58 | 3.3 | 2.0 | 0.63 | 1 | S | 130 |
| | 42 | 0.11 | 4.2 | | 2 | VS | |
| 6 | 50 | 5.8 | 1.85 | 0.57 | 1 | S | 140 |
| | 50 | 0.11 | 4.2 | | 2 | S | |
| 7 | 73 | 5.8 | 1.85 | 0.58 | 1 | S | ---- |
| | 27 | 0.01 | 6.5 | | 2 | VS | |
| 8 | 50 | 3.3 | 2.0 | 0.47 | 1 | VS | 110 |
| | 50 | 0.12 | 4.2 | | 2 | VS | |
| 9 | 43 | 5.8 | 1.85 | 0.41 | 1 | VS | 152 |
| | 57 | 0.12 | 4.2 | | 2 | S | |
| 10 | 41 | 9.3 | 1.6 | 0.42 | 1 | VS | 163 |
| | 59 | 0.12 | 4.2 | | 2 | VS | |
| 11 | 39 | 5.8 | 1.85 | 0.33 | 1 | VS | ---- |
| | 61 | 0.11 | 4.2 | | 2 | S | |
| 12 | 37 | 9.3 | 1.6 | 0.33 | 1 | S | ---- |
| | 63 | 0.11 | 4.2 | | 2 | S | |
| 13 | 33 | 9.3 | 1.6 | 0.24 | 1 | VS | ---- |
| | 67 | 0.11 | 4.2 | | 2 | VS | |
| 14 | 25 | 3.3 | 2.0 | 0.64 | 1 | VS | 132 |
| | 50 | 0.69 | 2.8 | | 2 | VS | |
| | 25 | 0.12 | 4.2 | | | | |
| 15 | 69 | 3.3 | 2.0 | 0.87 | 1 | VS | 163 |
| | 31 | 0.12 | 4.2 | | 2 | VS | |
| 16 | 60 | 5.8 | 1.85 | 0.84 | 1 | VS | 115 |
| | 40 | 0.12 | 4.2 | | 2 | VS | |
| 17 | 56 | 9.3 | 1.6 | 0.91 | 1 | VS | 150 |
| | 44 | 0.12 | 4.2 | | 2 | VS | |
| Individual polymers: | | | | | | | |
| A | | 9.3 | 1.62 | ---- | 1 | VS | 8 |
| B | | 0.15 | 4.2 | ---- | 1 | VR | 240 |
| C | | 3.3 | 1.98 | ---- | 1 | S | 20 |
| D | | 0.01 | 6.96 | ---- | 1 | VR | 280 |
| E | | 0.2 | 4.2 | ---- | 1 | VR | 220 |
| F | | 5.8 | 1.86 | ---- | 1 | VS | 16 |

It is obvious from the data that the blends of the invention possess the combination of good extrudability and high resistance to stress cracking which cannot be achieved in a single polymer of the same density.

What I claim and desire to protect by Letters Patent is:

1. A blend consisting essentially of two different transition metal-catalyzed polyethylenes, each of said polyethylenes having a density of at least about 0.96, one of said polyethylenes having a melt index ($I_2$, 190 C.) of at least about 3.0 and the other having a melt index ($I_2$, 190° C.) below about 0.3, each of said polyethylenes being present in the amount of at least about 25% by weight of the total blend, and the blend having a melt index ($I_2$, 190° C.) between about 0.3 and 1.5.

2. The composition of claim 1 in which the polyethylenes are each present in the form of particles of substantially uniform size.

References Cited by the Examiner

UNITED STATES PATENTS 2,868,762   6/59   Oakes _____ 260—897

FOREIGN PATENTS 599,566   6/60   Canada.
641,369   5/62   Canada.

MURRAY TILLMAN, *Primary Examiner.*

WILLIAM H. SHORT, LEON J. BERCOVITZ,
*Examiners.*

UNITED STATES PATENT OFFICE
CERTIFICATE OF CORRECTION

Patent No. 3,179,720

April 20, 1965

Arthur G. Hillmer

It is hereby certified that error appears in the above numbered patent requiring correction and that the said Letters Patent should read as corrected below.

Columns 3 and 4, in the Table, fourth column, line 11, opposite Example No. 10, for "0.42" read -- 0.43 --; column 5, line 9, for "190 C." read -- 190° C. --.

Signed and sealed this 14th day of September 1965.

(SEAL)
Attest:

ERNEST W. SWIDER
Attesting Officer

EDWARD J. BRENNER
Commissioner of Patents